United States Patent
Luna et al.

(10) Patent No.: US 6,298,087 B1
(45) Date of Patent: Oct. 2, 2001

(54) SYSTEM AND METHOD FOR DECODING A VARIABLE LENGTH CODE DIGITAL SIGNAL

(75) Inventors: Amelia Carino Luna, San Jose; Jason (Naxin) Wang, Sunnyvale; Richard Lawrence Williams, Scotts Valley, all of CA (US)

(73) Assignees: Sony Corporation, Tokyo (JP); Sony Electronics INC, Park Ridge, NJ (US)

(*) Notice: Subject to any disclaimer, the term of this patent is extended or adjusted under 35 U.S.C. 154(b) by 0 days.

(21) Appl. No.: 09/144,693

(22) Filed: Aug. 31, 1998

(51) Int. Cl.$^7$ ........................................ H04N 7/12
(52) U.S. Cl. ..................... 375/240.25; 375/240.23; 375/240.03
(58) Field of Search .................. 375/240.25, 240.03, 375/240.23; 348/405.1, 406.1; 341/65, 67; 358/261.1, 427; 709/247; 382/234, 245, 246, 251

(56) References Cited

U.S. PATENT DOCUMENTS

| | | | |
|---|---|---|---|
| 5,220,325 | 6/1993 | Ackland et al. | 341/67 |
| 5,233,348 | 8/1993 | Pollman et al. | 341/67 |
| 5,299,025 * | 3/1994 | Shirasawa | 358/400 |
| 5,341,318 | 8/1994 | Balkanski et al. | 364/725 |
| 5,379,351 | 1/1995 | Fandrianto et al. | 382/41 |
| 5,379,356 | 1/1995 | Purcell et al. | 382/56 |
| 5,422,736 * | 6/1995 | Katayama | 358/462 |
| 5,465,164 * | 11/1995 | Sugiura et al. | 358/448 |
| 5,469,208 | 11/1995 | Dea | 348/405.1 |
| 5,557,332 * | 9/1996 | Koyanagi et al. | 348/416 |
| 5,568,139 * | 10/1996 | Yoon | 341/67 |
| 5,598,483 | 1/1997 | Purcell et al. | 382/232 |
| 5,614,952 | 3/1997 | Boyce et al. | 348/392.1 |
| 5,621,466 * | 4/1997 | Miyane et al. | 348/405 |
| 5,663,763 * | 9/1997 | Yagasaki et al. | 348/405 |
| 5,724,453 | 3/1998 | Ratnakar et al. | 382/251 |
| 5,774,206 * | 6/1998 | Wasserman et al. | 709/247 |
| 5,969,650 * | 10/1999 | Wilson | 341/67 |
| 5,999,111 * | 12/1999 | Park et al. | 341/67 |

OTHER PUBLICATIONS

Hashemian, R., "Design and hardware implementation of a memory efficient Huffman decoding", IEEE Trans. on Consumer Electronics, vol. 40, iss. Aug. 3, 1994.*

Hashemian, R., "Memory efficient and high–speed search Huffman coding", IEEE Transactions on Communications, vol. 43, iss. 10, Oct. 1995.*

"Parallel Variable Length Decoding With Inverse Quantization For Software MPEG–2 Decoders", Daiji Ishii, Masao Ikekawa, and Ichiro Kuroda. p500–509.

* cited by examiner

*Primary Examiner*—Vu Le
(74) *Attorney, Agent, or Firm*—Ronald C. Card; Harold T. Fujii

(57) ABSTRACT

A variable length code decoder includes modified VLC decode tables as compared to table b.14 and b.15 of Annex B of the ISO/IEC 31818-2 standard, and improved program code for inverse quantising block DCT coefficients. The modified VLC decoding tables include level values corresponding to VLC coded words that have been pre-multiplied by the value 2, or by 2 then plus 1. As a result, the modified tables of the present invention reduces the computational complexity of the inverse quantization calculation of the method of the present invention as compared to the algorithm provided in ISO/IEC 31818-2, section 7. Advantageously, the bandwidth requirement of the inverse quantiser processor is reduced as compared to the bandwidth requirement of an inverse processor executing the inverse quantization calculation as defined in the Standard. Conveniently, lower cost, and more widely available processors may be used in the decoder of the present invention.

13 Claims, 2 Drawing Sheets

SYSTEM AND METHOD FOR DECODING A VARIABLE LENGTH CODE DIGITAL SIGNAL

FIELD OF THE INVENTION

The present invention relates to digital data signal decoding, and more particularly to a system, article, and method for variable length decoding and decompression of a digital video signal.

BACKGROUND OF THE INVENTION

Video sequences contain a significant amount of statistical and subjective redundancy within and between frames. One goal of video source coding is bit-rate reduction for storing and transmitting digital video data. One presently practiced method to reduce bit-rate includes compressing video digital data by utilizing the statistical and subjective redundancies within and between video frames, and encoding a "minimum set" of information using entropy coding techniques. This usually results in a compression of the coded video data compared to the original source data.

The International Standards Organization (ISO) has set a standard for video compression for generating a compressed digital data stream that is useful, for example, in the implementation of digital television. This standard is referred to as the ISO MPEG (International Standards Organization—Moving Pictures Experts Group, or "MPEG") standard. In accordance with the MPEG standard, video data is discrete cosine transformed (DCT), quantised, and Huffman encoded using variable length code packets for transmission.

One version of the MPEG standard, MPEG-2, includes ISO/IEC 13818-1 through ISO/IEC 13818-10 standards. The relevant video standard, ISO/IEC 31818-2 (the Standard), entitled "Information Technology—Generic Coding of Moving Pictures and Associated Audio Components: Video" defines a "lossy" video compression and encoding protocol to enable a target bit-rate for transmission of digital video data signals over communication channels with constrained or low bandwidth capabilities, and for minimizing the digital data storage requirements of the encoded video signals. As a result, MPEG video compression and encoding, and video decoding, include a series of complex steps that are computationally intensive.

In accordance with the Standard, a video picture frame is divided into a series of slices, each slice containing a number of picture areas called "macroblocks" with each macroblock in turn comprising six "blocks," Comprising four luminance blocks and two chrominance blocks.

Video compression of the pels within the block includes the step of transforming the video data into the frequency domain by using a 2-dimensional discrete cosine transform (DCT) algorithm to convert the video data into an 8×8 matrix of DCT coefficients. In a subsequent quantisation step, the coefficients are quantised thereby limiting the number of allowed values, and resulting in many of the higher frequency DCT coefficients being set to a zero value.

The 8×8 quantised DCT coefficient matrix is then linearized into a stream of quantised frequency coefficients. As most of the higher frequency coefficients are set to zero, linearization produces long runs of zeros. Further compression is achieved by converting the linearized stream of DCT coefficients into a series of run/level pairs. Each pair indicates the number of zero coefficients and the amplitude of the non-zero coefficient that ended the run. The run/level pairs are then coded using a variable length code (VLC), resulting in further compression by replacing shorter codes for more frequently occurring run/level pair values.

Video decoding is performed pursuant to section 7 of the Standard and includes the steps of VLC decoding, inverse scanning to reconstruct the 8×8 2-dimensional quantised DCT coefficient matrix, inverse quantising to recover a truncated set of DCT coefficients, and inverse DCT. In accordance with sections 7.2.2.1 through 7.2.2.4 of the Standard, the VLCs are decoded using tables B.14 and B.15 as provided in Annex B of the Standard. The decoded run/level pairs are then inverse scanned to provide an 8×8 quantised DCT coefficient matrix.

Following inverse scanning, an inverse quantisation step uses Equation 1 below, as specified by Section 7.4.2.3 of the Standard, to produce an inverse-quantised DCT coefficient matrix.

$$IQC[v][u] = ((2 \times QF[v][u] + k) \times W[w][v][u] \times \text{quantizer\_scale}/32 \quad \text{Eq. (1)}$$

Where: $IQC[v][u]$ is the inverse quantised DCT coefficient values at row v and column u of the block;
$k$ = 0 for intra-blocks, and = $\text{Sign}(QF[v][u])$ for non-intra-blocks (i.e., a "−1" for a negative, and "+1" for positive values of $QF[v][u]$), and k = 0 for $QF[v][u]$
$QF[v][u]$ are the quantised DCT coefficients in row v, column u;
$W[w][v][u]$ is a value selected from one of 4 weighting matrices as identified in section 7.4.2.1 of the Standard; and
quantizer_scale is a scale factor value as defined in section 2.4.2.2 of the Standard.

Equation 1 requires 5 calculations (3 multiplication steps, one addition step and a division step) for each coefficient. For standard definition TV, the number of DCT coefficients may be up to 506,880 requiring approximately 76,032,000 calculations per second. It is evident that the computational complexity increases with increasing picture resolution and frame rates. For example, in one application, the Standard may be used to support compressing and encoding high-definition television (HDTV) video data, wherein the video frames are of higher resolution (as large as 1920×1080 picture elements, or pels, per picture) than those used in present NTSC signals (up to 704×480 pels). Inverse quantisation of the quantised DCT coefficients in this case would require approximately 466,560,000 calculations per second at 30 frames per second.

The demands placed on the decoder can easily consume the entire bandwidth of the decoder processor thereby limiting the decoder's ability to perform other tasks. Such computationally intensive steps require decoder processors that are designed to decode in real time. Processors satisfying the computational demands of the decoding process must be economically priced and readily available in order to render a video decoder practical and to permit economical implementation. Accordingly there is a need to reduce the computational load on a video decoder to thereby permit the use of off-the shelf, readily available processors.

SUMMARY OF THE INVENTION

The system of the present invention includes a digital data decoder, and in particular an MPEG video decoder, having substantially lower computational bandwidth requirements as compared to presently available video decoders. The system of the present invention includes a VLC decoder circuit, an inverse scanning circuit, and an inverse quantiser circuit. The VLC decoder circuit includes at least one data memory, a program memory, and a decoder processor. It is understood by those skilled in the art that the system of the present invention may be embodied as a general purpose processor circuit wherein all functionality is imparted by program code segments stored in memory. It is also understood, that application specific circuits may be defined having minimum program code wherein decoder functionality is executed for the most part in hardware.

In accordance with one feature of the system of the present invention, the VLC decoder circuit includes a memory device having stored therein improved VLC decoding tables. These improved decoding tables include run/level pair combinations wherein the level values been precalculated to include substantially all scalar multiplicands otherwise included as operands in the inverse quantisation calculation. For example, the tables tangibly embodied in the machine readable memories of the present invention have been multiplied by 2 as compared to Tables B.14 and B.15 of Annex B of the Standard. By "pre-multiplying" the values of the levels in the tables of the present invention by the scalar values otherwise included in the inverse quantisation calculation, the inverse quantisation equation as described in Equation 1 is computationally simplified by at least one multiplication step (in the case of an MPEG-2 encoded video signal the multiplication "2×QF[v][u]" is eliminated)), thus significantly reducing the computational bandwidth requirements of the inverse quantiser circuit.

Advantageously, there are three tables stored as machine readable digital data bits in the memory to permit accommodating both MPEG-1 and MPEG-2 encoded video data, and intra and non-intra encoded video data. This results in the further simplification of Equation 1 by substantially eliminating the addition calculation (i.e., the addition of the constant "k") associated with inverse quantisation of non-intrablock video data. In one embodiment of the present invention, the sign value (i.e., "k") is presumed to be equal to one. The process of the present invention checks the value of the sign for each coded word. If the sign is negative, the entire value retrieved from the appropriate table is made negative.

Memory devices suitable for the system of the present invention include any device capable of storing machine readable program code, for example but not limited to, RAM, ROM, EPROM, magnetic disk, optical disk, holographic memory devices, and the like.

In accordance with another feature of the system of the present invention, a program memory is provided in the VLC decoder circuit containing program code segments for identifying video compression type (MPEG-1 or MPEG-2), for reading the VLC of the particular quantised DCT coefficient, and for retrieving the appropriate, modified run/level pair values from the data memory of the present invention having stored therein the appropriate VLC decoding table. In some embodiments, the program code segments reside in a program memory space disposed in the same physical memory as the modified VLC table digital data of the present invention. In other embodiments, the program code is disposed in a separate memory or register.

In accordance with another feature of the inverse quantiser circuit of the system of the present invention, a program memory includes program code segments for calculating the inverse quantised DCT coefficient value from the modified level value returned from the VLC decoder circuit. The program code segments include a computationally simplified calculation resulting from the modified VLC decoder tables thereby significantly reducing the bandwidth requirements of the inverse quantiser processor as compared to the algorithm specified in the Standard. As a result, the computational overhead on the inverse quantiser processor is reduced permitting the use of off-the-shelf, lower-cost processors.

BRIEF DESCRIPTION OF THE DRAWINGS

The features of the invention believed to be novel are set forth with particularity in the appended claims. The present invention may be better understood, and its numerous features and advantages made apparent to those skilled in the art by reference to the accompanying drawings.

In the description below, like reference numerals are used to describe the same, similar or corresponding parts in the several views of the drawing.

DETAILED DESCRIPTION OF THE INVENTION

Figure 1:
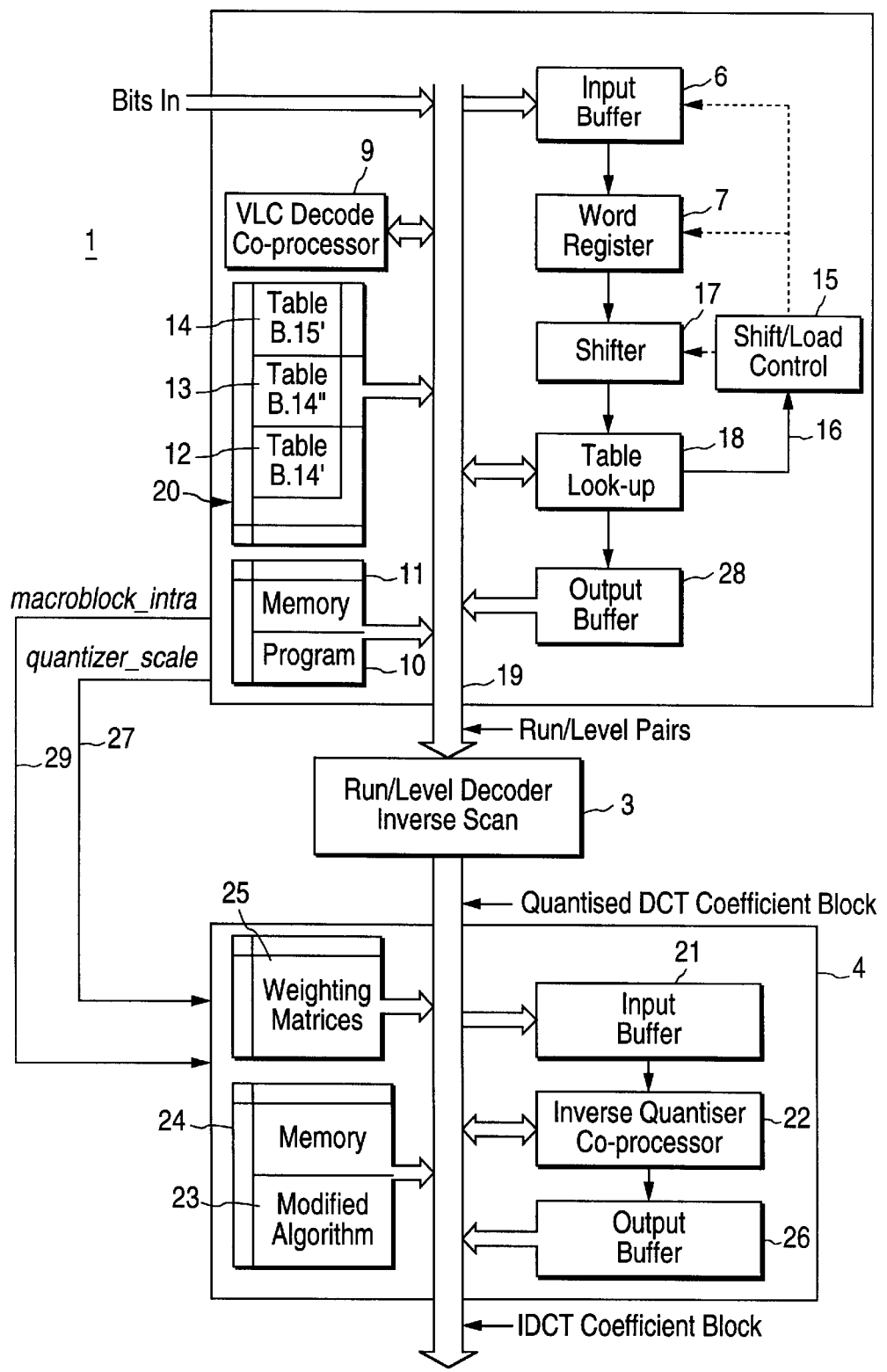
FIG. 1 is a conceptual diagram of one embodiment of the system of the present invention showing the encoded memory of the present invention containing the modified VLC decoding tables, and showing the program memory of the present invention containing program code segments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. For example, while the embodiments in the following detailed description are related to MPEG encoded video, it is understood that the system and method of the present invention may be applied to any decoding system and method which uses VLC decoding tables to calculate the level value of a quantised transform coefficient.

Turning now to FIG. 1, one embodiment of the system 1 of the decoder of the present invention includes a variable length decoder 2, a run/level decoder and inverse scanner 3, and an inverse quantiser circuit 4. In some embodiments, the variable length decoder 2, the run/level decoder 3, and the inverse quantiser 4 are application specific processor circuits on separate dies that are electronically connected to one another via electrically conductive traces on a printed circuit board. In other embodiments the application specific circuits are provided as separate devices on a single die. In yet another embodiment, the system of this invention includes at least one general purpose microprocessor and software code segments to enable the general purpose computer to perform the decoding and inverse quantisation steps of the method of the present invention.

The variable length decoder circuit 2 shown in FIG. 1 is an application specific processor circuit for recognizing code words embedded in a stream of bits 5. The bits 5 are read into input buffer 6 with the bits aligned at fixed word length boundaries. The data in buffer 6 is loaded into word register 7. Word register 7 is long enough to store at least one codeword plus some trailing bits. Table look-up circuit 18, in cooperation with variable length code decoder co-processor 9, retrieves a run/length pair value from one of three look-up tables of the present invention stored in memory 20 in accordance with the content of the word register 7. In accordance with one aspect of the article of the present invention, memory 20 contains at least one of the three variable length decoding tables described below. Memory 20 is selected from memory devices including, but not limited to, magnetic storage devices, optical storage devices, solid-state storage devices including RAM, ROM, EPROM, holographic storage devices, and the like.

Pursuant to an algorithm 10 stored in non-volatile memory 11, variable length code words having a vlc_format=0 and identified with AC DCT coefficients of intra-macroblocks are decoded using table B.14'. In accordance with the memory device of the present invention, the data stored in memory 12 as table B.14' is determined by multiplying by the value 2 the level value from table B.14 of the ISO/IEC 13818-2 Standard corresponding to the variable length code word. Conveniently, as will be further discussed below, intra-macroblock, non-DC DCT coefficient variable length coded words are decoded to provide a run/level pair wherein the decoded level value is twice the value otherwise provided by table B.14 of the ISO/IEC 13818-2 standard. Table B.14' of the present invention is attached hereto as Appendix A.

All non-intra macroblock related variable length code words are decoded using table B.14" of the present invention. In accordance with the memory device of the present invention, the data stored in memory 13 as table B.14" is determined by multiplying by the value 2, and then adding a value of 1 to that result, the decoded level value from table B.14 of the ISO/IEC 13818-2 standard corresponding to the variable length code word. Conveniently, as will be further discussed below, non-intra macroblock-type related variable length coded words are decoded to provide a run/level pair wherein the decoded level value is twice the value, plus one, of the value otherwise provided by table B.14 of the ISO/IEC 13818-2 standard. Table B.14" of the present invention is attached hereto as Appendix B.

Intra-macroblock related variable length code words having a vlc_format=1 are decoded using table B.15' of the present invention. In accordance with the memory device of the present invention, the data stored in memory 14 as table B.15' is defined by multiplying by the value 2 the decoded level value from table B.15 of the ISO/IEC 13818-2 standard corresponding to the variable length code word. Conveniently, as will be further discussed below, intra macroblock type related variable length coded words having a vlc_format value equal to 1 are decoded to provide a run/level pair wherein the decoded level value is twice the value of the value otherwise provided by table B.15 of the ISO/IEC 13818-2 standard. Table B.15' is attached hereto as Appendix C.

In the event the coded word corresponds to an escape code, a separate table may be provided to accommodate the escape code. Alternately, a program segment that decodes the escape code may be executed.

The size of the codeword in the word register is ascertained by co-processor 9 and is fed back to the shift/load control 15 via line 16. The shift/load control keeps a running count of the next leading bit position within the word register 7. The shifter 17 uses the running count to discard the decoded bits and to align the new leading bits for looking up the next code word. If the number of valid bits in the word register 7 falls below a certain threshold, the valid bits are shifted up and loaded in the word register 7 together with new data bits from the input buffer 6. The running count is adjusted accordingly to reflect the new leading bit position. The decoded word is stored in buffer 18 as a run/level pair. The run/level pair values are clocked out of buffer 18 and asserted onto bus 19 for out put to the run/level decoder and inverse scanner circuit 3.

Run/level decoder and inverse scanner circuit 3 receives the run/level pair data from buffer 28 and reconstructs the 8×8 pel block in accordance with the run number value and the level value of the run/level pair. The resulting square matrix includes the quantised DCT coefficients, QF[v][u]. Various architectures for the run/level decoder and inverse scanner are known to those practicing in the art, and include but are not limited to generic processors operating software implementations of the run/level decoder and inverse scanner, application-specific processing engines, and custom data-path engines having special purpose processors based on application-specific commands.

Pursuant to the algorithm 23 stored in memory 24, inverse quantiser 4 reads each non-intra block's quantised DCT coefficient, or each intra-block AC quantised DCT coefficient from the inverse scanned block data into input buffer 21. The stored data is then retrieved by inverse quantiser co-processor 22 which converts the quantised DCT coefficient into a weighted and scaled inverse-quantised DCT (IQC) coefficient according to the following equation:

$$IQC[v][u]=QF'[v][u]\times W[w][v][u]\times quantizer\_scale/32 \quad \text{Eq.(2)}$$

where:
  IQC[v][u] is the inverse quantised level value of the DCT coefficient at coordinates v and u of the 2-dimensional block array;
  QF'[v][u] is the decoded, inverse scanned, quantised DCT coefficient as provided by the tables B.14', B.14", and B.15' of the present invention, and v and u represent position indices within the 2-dimensional quantised DCT coefficient array;
  W[w][v][u] is one of four weighting matrices: for 4:2:0 data, two weighting matrices, one for intra macroblocks and the other for non-intra macroblocks are used, and for 4:2:2 and 4:4:4 data, four matrices are used. The value of intra_macroblock is communicated from the VLC decoder circuit 2 to the inverse quantiser circuit 4 via line 29. The index w takes the value 0 to 3 indicating which matrix is to be used. Table I summarizes the rules governing the selection of w; and
  quantizer_scale is the quantiser scale factor value used to apply in the inverse quantisation arithmetic of Eq. 1, and is provided to quantiser circuit 4 over line 27.

TABLE I

| | SELECTION OF W | | | |
| --- | --- | --- | --- | --- |
| | 4:2:0 | | 4:2:2 and 4:4:4 | |
| | Luminance | Chrominance | Luminance | Chrominance |
| intra blocks (macroblock_intra = 1) | 0 | 0 | 0 | 2 |
| non-intra blocks (macroblock_intra = 0) | 1 | 1 | 1 | 3 |

In the embodiment shown in FIG. 1, the weighting matrices are stored in memory 24. In an alternate embodiment, the weighting matrices may be stored in RAM memory location 25, shown in phantom in FIG. 1, particularly where memory 24 is a read only memory (ROM), since the weighting matrices may be overwritten by down-loading user defined matrices. Selection of the appropriate weighting matrix is determine by the value of macroblock_intra asserted on line 29 by decoder circuit 2. Memory 24 is selected from magnetic or optical memory devices, or from solid state memories including, but not limited to RAM, ROM, EPROM, and three-dimensional holographic memory devices. The algorithm 23 stored in memory 24 is in a form readable by the inverse quantisation processor 22.

Advantageously, the VLC decoding tables of the present invention significantly reduce the number of calculations required of the VLC decoder, thereby permitting faster decoding and making available additional processor bandwidth for other applications. One multiplication and one addition operations ("2×QF[v][u]" and "(2×QF[v][u])+k) are eliminated in Equation 2 as compared to Equation 1 of the prior art. If for example, we have 64 coefficients per block, 6 blocks per macroblock, 1320 macroblocks per frame, and 30 frames per second, then approximately 30,412,800 operations are avoided every second.

Figure 2:
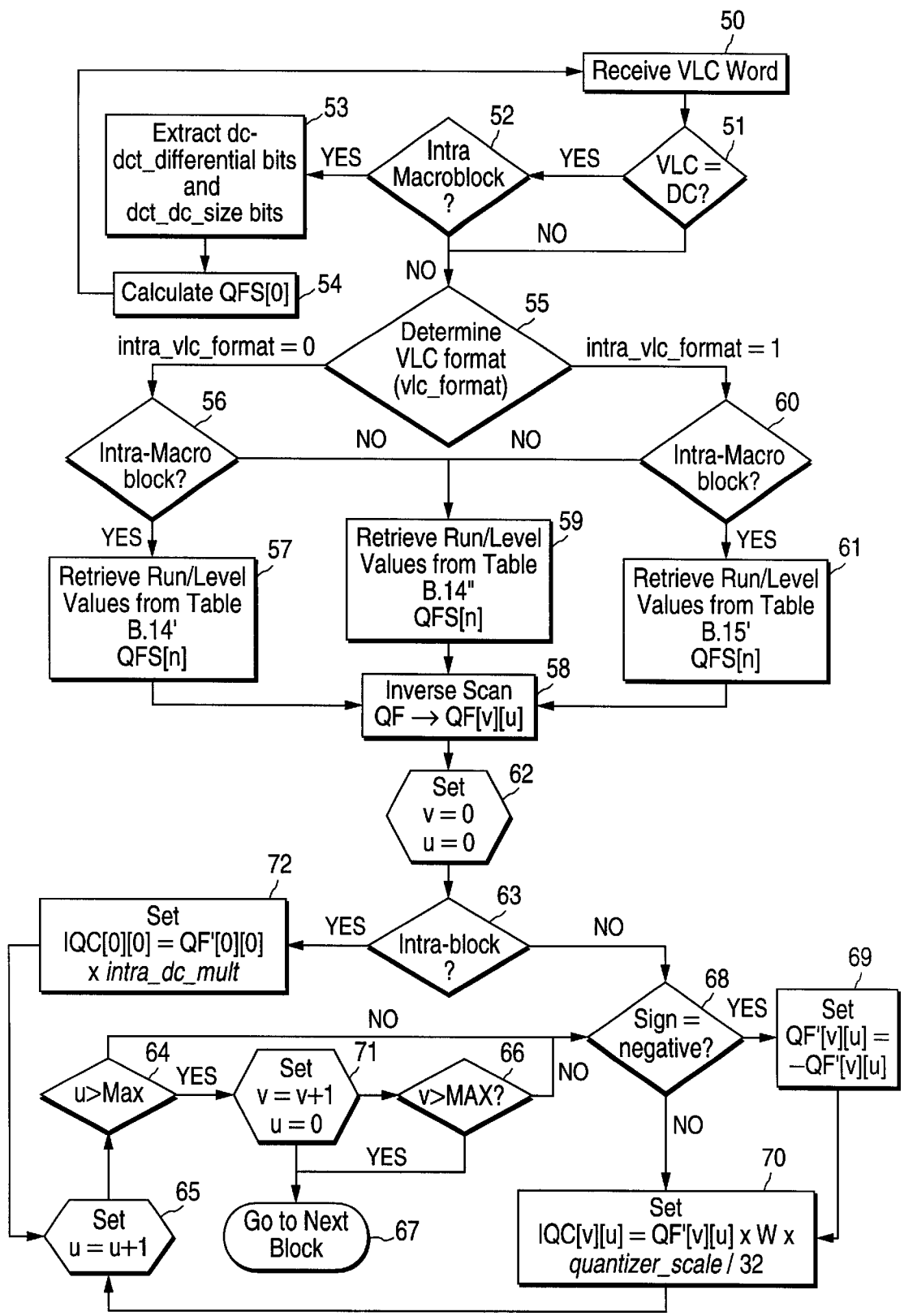
FIG. 2 is a flowchart diagram showing the steps performed by one embodiment of the method of the present invention.

One embodiment of the method of the present invention is shown in FIG. 2. The VLC decoder of the present invention receives the variable length code word at step 50 and determines at step 51 whether the VLC code word corresponds to a DC term of the coded transform coefficient matrix. If the VLC code word is identified as the DC term of a coded transform coefficient, the system next determines at step 52 whether the macroblock associated with the DC coefficient is intra or non-intra. If the macroblock is intra, the coded DC coefficient is decoded by recovering a differential value, dct_differential, and the bit size of the differential value, dct-dc-size, from the coded data. The value of dct_differential is added to a predictor in order to recover the final decoded coefficient. The decoded value of the VLC word for the coded DC coefficient of an intra-macroblock, connoted as QFS[0], is calculated at step 54 from dct-dc-size and dct_differential according to the algorithm defined in section7.2.1 of the ISO/IEC 13818-2 International Standard.

If at step 52 it is determined that the macroblock identified with the coded DC coefficient is not an intra-macroblock, or if at step 51 it is determined that the VLC coded word corresponds to an AC transform coefficient, then the method of the present invention proceeds to determine at step 55 the particular VLC format used to encode the VLC word. All DCT coefficients under the ISO/IEC 13818-2 international standard must be encoded using Tables B.14, B.15, and B.16 (escape codes) of the standard. The Standard also specifies which Table is used to decode the DCT coefficients, as shown in Table II.

TABLE II

Selection of DCT Coefficient VLC Tables Pursuant to ISO/IEC 13818-2

| intra_vlc_format | 0 | 1 |
|---|---|---|
| intra blocks (macro-intra_intra = 1) | B.14 | B.15 |
| non-intra blocks (macroblock_intra = 0) | B.14 | B.14 |

According to the system and method of the present invention the Tables B.14 and B.15 of Table II above are replaced with Tables B.14', B.14", and B.15' of the present invention as shown in Table III below.

TABLE III

Selection of DCT Coefficient VLC Tables Pursuant to Present Invention

| intra_vlc_format | 0 | 1 |
|---|---|---|
| intra blocks (macroblock_intra = 1) | B.14' | B.15' |
| non-intra blocks (macroblock_intra = 0) | B.14" | B.14" |

As shown in FIG. 2, if at step 56 the "0-formatted" VLC word corresponds to an intra-macroblock, run/level number pairs for that block are retrieved at step 57 from Table B.14' of the present invention. If however, the VLC word corresponds to a non-intra macroblock at step 56, or if the VLC format value is equal to 1 at step 55, and if at step 60 it is determined that the macroblock is non-intra, then the run/level pairs for that block are retrieved from Table B.14" of the present invention.

If at step 60 the macroblock is determined to be intra, then the run/level pair values for that block are retrieved from Table B.15' of the present invention.

The decoded run/level pair data, QFS[n], where n is an index in the range of 0 to 63, is run/level decoded, and inversed scanned at step 53 to provide a fully populated block, for example, an 8×8 array for MPEG encoded video, of quantised transform coefficients, QF'[v][u]. Where the block was encoded pursuant to ISO/IEC 13818-2, then the coefficients, QF'[v][u], are quantised DCT coefficients.

The method of the present invention continues with inverse quantization of QF'[v][u] by first initializing block indices v and u by setting their values equal to 0 at step 62. At step 63 a determination is made of whether the corresponding block is an intra block. If the coefficient QF'[0][0] is the DC coefficient of an intra block, the inverse-quantised DC coefficient is calculated at step 72 according to the following equation:

$$IQC[0][0]=QF'[0][0] \times intra\_mult\_dc \qquad Eq.(4)$$

where intra_multi_dc is a constant multiplier related to the parameter intra_dc_precision (which in turn is a value encoded in the bit stream and received at step 50) according to the following Table IV.

TABLE IV

Relation Between intra_dc_precision and Intra_mult_dc

| intra_dc_precision | Bits of Precision | intra_mult_dc |
|---|---|---|
| 0 | 8 | 8 |
| 1 | 9 | 4 |
| 2 | 10 | 2 |
| 3 | 11 | 1 |

Once the DC coefficient of the intra-block has been inverse quantised, the block index u is incremented at step 65 by one. At step 64, the index u is compared to a predetermined maximum value corresponding to the column position of the quantised DCT coefficient in the matrix QF'[v][u]. For example, in an 8×8 block, both v and u are limited to a value between 0 and 7. If the value of u is greater than the predetermined maximum value, then u is reset to the value 0, and v is incremented by 1 at step 71. The value of v is then tested at 66 to ensure that it is less than a predefined maximum (e.g., between 0 and 7 for an 8×8 block). If the value of v is greater than the predefined maximum, the process for the present block terminates at step 67, and the quantised and coded data for the next block is decoded according to the process of the present invention beginning with step 50.

If after steps 64 and 66 additional non-DC coefficient values remain to be inverse quantised, or if at step 63 it is determined that the block is a non-intra block, the process of the present invention then determines at step 68 the sign value of QF'[v][u]. If the value of the sign bit, as provided in the input bit stream, is negative then the value of QF'[v][u] is made negative at step 69. At step 70, the inverse-quantised DCT coefficient is calculated according to Equation 2 or Equation 3, and as discussed above. If at step 68 the sign value of QF'[v][u] is "1" then step 69 is skipped and the inverse quantised DCT coefficient is directly calculated at step 70. Advantageously, and as discussed above, the total number of calculations required to inverse quantise the transform coefficient matrix is reduced as a result of Tables B.14', B.14", and B.15' of the present invention.

At step 65, the block index, u, is again incremented by 1 and then tested at step 64 to ensure that the value of u does not exceed a predefined maximum. Similarly, the index v is incremented by one when the value of u exceeds the predefined maximum value at step 71, and u is reset to the value zero. If the value of both indices is greater than the predetermined maximum value, the inverse quantisation process for the current block terminates at step 67 and the method of the present invention repeats for subsequent blocks beginning at step 50.

In accordance with the system of the present invention, a variable length code decoder includes modified VLC decode tables, and improved program code for inverse quantising block DCT coefficients. It is clearly evident in view of the foregoing discussion that the modified VLC decoding tables decreases the computational complexity of the inverse quantization calculation as compared to the algorithm provided in the Standard. Advantageously, the bandwidth requirement of the inverse quantiser processor is reduced as compared to the bandwidth requirement of an inverse processor executing the inverse quantization calculation as defined in the Standard. Conveniently, lower cost, and more widely available processors may be used in the decoder of the present invention.

In accordance with the method of the present invention, the inverse quantisation calculation is simplified by providing modified VLC decoding tables containing run/level pair values. Advantageously, the level values have been adjusted to permit fewer calculational steps in order to inverse quantise the decoded video data.

It is apparent in view of the above discussion that an apparatus and method that fully satisfies the aims and advantages of the present invention is set forth above. While the invention has been described in conjunction with specific embodiments, it is evident that many alternatives, modifications, permutations and variations will become apparent to those skilled in the art in light of the foregoing description. For example, while the VLC decoding system and method is particularly suited for VLC decoding, and inverse quantisation of MPEG 1 and MPEG 2 compressed video, other video compression methods which include quantisation and variable length encoding of transform coefficients are also contemplated by the video decoding system and method of the present invention. Moreover, it is evident in view of the foregoing discussion that the decoding and inverse quantisation system and method of the present invention may be adapted to any encoded, quantised digital data signal such as audio, reconstruction of holographically stored data, and the like. Also, it is understood in view of the foregoing discussion that the system of the present invention may be embodied as a general purpose processor and memory wherein all functionality is imparted by process readable code segments. Alternately, processing economies may be realized by substituting hardware implementation of selected decoding steps. Accordingly, it is intended that the present invention embrace all such alternatives, modifications and variations as fall within the scope of the appended claims.

TABLE B.14'

APPENDIX A

| Variable length code (Note 1) | Run | Level |
|---|---|---|
| 10 (Note 2) | End of Block | |
| 011 s | 1 | 2 |
| 0100 s | 0 | 4 |
| 0101 s | 2 | 2 |
| 0010 1 s | 0 | 6 |
| 0011 1 s | 3 | 2 |
| 0011 0 s | 4 | 2 |
| 0001 10 s | 1 | 4 |
| 0001 11 s | 5 | 2 |
| 0001 01 s | 6 | 2 |
| 0001 00 s | 7 | 2 |
| 0000 110 s | 0 | 8 |
| 0000 100 s | 2 | 4 |
| 0000 111 s | 8 | 2 |
| 0000 101 s | 9 | 2 |
| 0000 01 | Escape | |
| 0010 0110 s | 0 | 10 |
| 0010 0001 s | 0 | 12 |
| 0010 0101 s | 1 | 6 |
| 0010 0100 s | 3 | 4 |
| 0010 0111 s | 10 | 2 |
| 0010 0011 s | 11 | 2 |
| 0010 0010 s | 12 | 2 |
| 0010 0000 s | 13 | 2 |
| 0000 0010 10 s | 0 | 14 |
| 0000 0011 00 s | 1 | 8 |
| 0000 0010 11 s | 2 | 6 |
| 0000 0011 11 s | 4 | 4 |
| 0000 0010 01 s | 5 | 4 |
| 0000 0011 10 s | 14 | 2 |
| 0000 0011 01 s | 15 | 2 |
| 0000 0010 00 s | 16 | 2 |
| 0000 0001 1101 s | 0 | 16 |
| 0000 0001 1000 s | 0 | 18 |
| 0000 0001 0011 s | 0 | 20 |
| 0000 0001 0000 s | 0 | 22 |
| 0000 0001 1011 s | 1 | 10 |
| 0000 0001 0100 s | 2 | 8 |
| 0000 0001 1100 s | 3 | 6 |
| 0000 0001 0010 s | 4 | 6 |
| 0000 0001 1110 s | 6 | 4 |
| 0000 0001 0101 s | 7 | 4 |
| 0000 0001 0001 s | 8 | 4 |
| 0000 0001 1111 s | 17 | 2 |
| 0000 0001 1010 s | 18 | 2 |
| 0000 0001 1001 s | 19 | 2 |
| 0000 0001 0111 s | 20 | 2 |
| 0000 0001 0110 s | 21 | 2 |
| 0000 0000 1101 0 s | 0 | 24 |
| 0000 0000 1100 1 s | 0 | 26 |
| 0000 0000 1100 0 s | 0 | 28 |
| 0000 0000 1011 1 s | 0 | 30 |
| 0000 0000 1011 0 s | 1 | 12 |
| 0000 0000 1010 1 s | 1 | 14 |
| 0000 0000 1010 0 s | 2 | 10 |
| 0000 0000 1001 1 s | 3 | 8 |
| 0000 0000 1001 0 s | 5 | 6 |
| 0000 0000 1000 1 s | 9 | 4 |
| 0000 0000 1000 0 s | 10 | 4 |
| 0000 0000 1111 1 s | 22 | 2 |
| 0000 0000 1111 0 s | 23 | 2 |
| 0000 0000 1110 1 s | 24 | 2 |
| 0000 0000 1110 0 s | 25 | 2 |

TABLE B.14'-continued

APPENDIX A

| Variable length code (Note 1) | Run | Level |
|---|---|---|
| 0000 0000 1101 1 s | 26 | 2 |
| 0000 0000 0001 0011 s | 1 | 30 |
| 0000 0000 0001 0010 s | 1 | 32 |
| 0000 0000 0001 0001 s | 1 | 34 |
| 0000 0000 0001 0000 s | 1 | 36 |
| 0000 0000 0001 0100 s | 6 | 6 |
| 0000 0000 0001 1010 s | 11 | 4 |
| 0000 0000 0001 1001 s | 12 | 4 |
| 0000 0000 0001 1000 s | 13 | 4 |
| 0000 0000 0001 0111 s | 14 | 4 |
| 0000 0000 0001 0110 s | 15 | 4 |
| 0000 0000 0001 0101 s | 16 | 4 |
| 0000 0000 0001 1111 s | 27 | 2 |
| 0000 0000 0001 1110 s | 28 | 2 |
| 0000 0000 0001 1101 s | 29 | 2 |
| 0000 0000 0001 1100 s | 30 | 2 |
| 0000 0000 0001 1011 s | 31 | 2 |

NOTES
1 The last bit 's' denotes the sign of the level: '0' for positive, '1' for negative.
2 "End of Block" shall not be the only code of the block.

TABLE B.14"

APPENDIX B

| Variable length code (Note 1) | Run | Level |
|---|---|---|
| 10 (Note 2) | End of Block | |
| 1 s (Note 3) | 0 | 3 |
| 11 s (Note 4) | 0 | 3 |
| 011 s | 1 | 3 |
| 0100 s | 0 | 5 |
| 0101 s | 2 | 3 |
| 0010 1 s | 0 | 7 |
| 0011 1 s | 3 | 3 |
| 0011 0 s | 4 | 3 |
| 0001 10 s | 1 | 5 |
| 0001 11 s | 5 | 3 |
| 0001 01 s | 6 | 3 |
| 0001 00 s | 7 | 3 |
| 0000 110 s | 0 | 9 |
| 0000 100 s | 2 | 5 |
| 0000 111 s | 8 | 3 |
| 0000 101 s | 9 | 3 |
| 0000 01 | Escape | |
| 0010 0110 s | 0 | 11 |
| 0010 0001 s | 0 | 13 |
| 0010 0101 s | 1 | 7 |
| 0010 0100 s | 3 | 7 |
| 0010 0111 s | 10 | 3 |
| 0010 0011 s | 11 | 3 |
| 0010 0010 s | 12 | 3 |
| 0010 0000 s | 13 | 3 |
| 0000 0010 10 s | 0 | 15 |
| 0000 0011 00 s | 1 | 9 |
| 0000 0010 11 s | 2 | 7 |
| 0000 0011 11 s | 4 | 5 |
| 0000 0010 01 s | 5 | 5 |
| 0000 0011 10 s | 14 | 3 |
| 0000 0011 01 s | 15 | 3 |
| 0000 0010 00 s | 16 | 3 |
| 0000 0001 1101 s | 0 | 17 |
| 0000 0001 1000 s | 0 | 19 |
| 0000 0001 0011 s | 0 | 21 |
| 0000 0001 0000 s | 0 | 23 |
| 0000 0001 1011 s | 1 | 11 |
| 0000 0001 0100 s | 2 | 9 |
| 0000 0001 1100 s | 3 | 7 |
| 0000 0001 0010 s | 4 | 7 |
| 0000 0001 1110 s | 6 | 5 |
| 0000 0001 0101 s | 7 | 5 |

TABLE B.14"-continued

APPENDIX B

| Variable length code (Note 1) | Run | Level |
|---|---|---|
| 0000 0001 0001 s | 8 | 5 |
| 0000 0001 1111 s | 17 | 3 |
| 0000 0000 1010 s | 18 | 3 |
| 0000 0001 1001 s | 19 | 3 |
| 0000 0001 0111 s | 20 | 3 |
| 0000 0001 0110 s | 21 | 3 |
| 0000 0000 1101 0 s | 0 | 25 |
| 0000 0000 1100 1 s | 0 | 27 |
| 0000 0000 1100 0 s | 0 | 29 |
| 0000 0000 1011 1 s | 0 | 31 |
| 0000 0000 1011 0 s | 1 | 13 |
| 0000 0000 1010 1 s | 1 | 15 |
| 0000 0000 1010 0 s | 2 | 11 |
| 0000 0000 1001 1 s | 3 | 9 |
| 0000 0000 1001 0 s | 5 | 7 |
| 0000 0000 1000 1 s | 9 | 5 |
| 0000 0000 1000 0 s | 10 | 5 |
| 0000 0000 1111 1 s | 22 | 3 |
| 0000 0000 1111 0 s | 23 | 3 |
| 0000 0000 1110 1 s | 24 | 3 |
| 0000 0000 1110 0 s | 25 | 3 |
| 0000 0000 1101 1 s | 26 | 3 |
| 0000 0000 0001 0011 s | 1 | 31 |
| 0000 0000 0001 0010 s | 1 | 33 |
| 0000 0000 0001 0001 s | 1 | 35 |
| 0000 0000 0001 0000 s | 1 | 37 |
| 0000 0000 0001 0100 s | 6 | 7 |
| 0000 0000 0001 1010 s | 11 | 5 |
| 0000 0000 0001 1001 s | 12 | 5 |
| 0000 0000 0001 1000 s | 13 | 5 |
| 0000 0000 0001 0111 s | 14 | 5 |
| 0000 0000 0001 0110 s | 15 | 5 |
| 0000 0000 0001 0101 s | 16 | 5 |
| 0000 0000 0001 1111 s | 27 | 3 |
| 0000 0000 0001 1110 s | 28 | 3 |
| 0000 0000 0001 1101 s | 29 | 3 |
| 0000 0000 0001 1100 s | 30 | 3 |
| 0000 0000 0001 1011 s | 31 | 3 |

NOTES
1 The last bit 's' denotes the sign of the level: '0' for positive, '1' for negative.
2 "End of Block" shall not be the only code of the block.
3 This code shall be used for the first coefficient in the block.
4 This code shall be used for all other coefficients.

TABLE B.15'

APPENDIX C

| Variable length code (Note 1) | Run | Level |
|---|---|---|
| 0110 (Note 2) | End of Block | |
| 10s | 0 | 2 |
| 010 s | 1 | 2 |
| 110 s | 0 | 4 |
| 0010 1 s | 2 | 2 |
| 0111 s | 0 | 6 |
| 0011 1 s | 3 | 2 |
| 0001 10 s | 4 | 2 |
| 0011 0 s | 1 | 4 |
| 0001 11 s | 5 | 2 |
| 0000 110 s | 6 | 2 |
| 0000 100 s | 7 | 2 |
| 1110 0 s | 0 | 8 |
| 0000 111 s | 2 | 4 |
| 0000 101 s | 8 | 2 |
| 1111 000 s | 9 | 2 |
| 0000 01 | Escape | |
| 1110 1 s | 0 | 10 |
| 0001 01 s | 0 | 12 |
| 1111 001 s | 1 | 6 |
| 0010 0110 s | 3 | 4 |

TABLE B.15'-continued

APPENDIX C

| Variable length code (Note 1) | Run | Level |
|---|---|---|
| 1111 010 s | 10 | 2 |
| 0010 0001 s | 11 | 2 |
| 0010 0101 s | 12 | 2 |
| 0010 0100 s | 13 | 2 |
| 0001 00 s | 0 | 14 |
| 0010 0111 s | 1 | 8 |
| 1111 1100 s | 2 | 6 |
| 1111 1101 s | 4 | 4 |
| 0000 0010 0 s | 5 | 4 |
| 0000 0010 1 s | 14 | 2 |
| 0000 0011 1 s | 15 | 2 |
| 0000 0011 01 s | 16 | 2 |
| 1111 011 s | 0 | 16 |
| 1111 100 s | 0 | 18 |
| 0010 0011 s | 0 | 20 |
| 0010 0010 s | 0 | 22 |
| 0010 0000 s | 1 | 10 |
| 0000 0011 00 s | 2 | 8 |
| 0000 0001 1100 s | 3 | 6 |
| 0000 0001 0010 s | 4 | 6 |
| 0000 0001 1110 s | 6 | 4 |
| 0000 0001 0101 s | 7 | 4 |
| 0000 0001 0001 s | 8 | 4 |
| 0000 0001 1111 s | 17 | 2 |
| 0000 0001 1010 s | 18 | 2 |
| 0000 0001 1001 s | 19 | 2 |
| 0000 0001 0111 s | 20 | 2 |
| 0000 0001 0110 s | 21 | 2 |
| 1111 1010 s | 0 | 24 |
| 1111 1011 s | 0 | 26 |
| 1111 1110 s | 0 | 28 |
| 1111 1111 s | 0 | 30 |
| 0000 0000 1011 0 s | 1 | 12 |
| 0000 0000 1010 1 s | 1 | 14 |
| 0000 0000 1010 0 s | 2 | 10 |
| 0000 0000 1001 1 s | 3 | 8 |
| 0000 0000 1001 0 s | 5 | 6 |
| 0000 0000 1000 1 s | 9 | 4 |
| 0000 0000 1000 0 s | 10 | 4 |
| 0000 0000 1111 1 s | 22 | 2 |
| 0000 0000 1111 0 s | 23 | 2 |
| 0000 0000 1110 1 s | 24 | 2 |
| 0000 0000 1110 0 s | 25 | 2 |
| 0000 0000 1101 1 s | 26 | 2 |
| 0000 0000 0111 11 s | 0 | 32 |
| 0000 0000 0111 10 s | 0 | 34 |
| 0000 0000 0111 01 s | 0 | 36 |
| 0000 0000 0111 00 s | 0 | 38 |
| 0000 0000 0110 11 s | 0 | 40 |
| 0000 0000 0110 10 s | 0 | 42 |
| 0000 0000 0110 01 s | 0 | 44 |
| 0000 0000 0110 00 s | 0 | 46 |
| 0000 0000 0101 11 s | 0 | 48 |
| 0000 0000 0101 10 s | 0 | 50 |
| 0000 0000 0101 01 s | 0 | 52 |
| 0000 0000 0101 00 s | 0 | 54 |
| 0000 0000 0100 11 s | 0 | 56 |
| 0000 0000 0100 10 s | 0 | 58 |
| 0000 0000 0100 01 s | 0 | 60 |
| 0000 0000 0100 00 s | 0 | 62 |
| 0000 0000 0011 000 s | 0 | 64 |
| 0000 0000 0010 111 s | 0 | 66 |
| 0000 0000 0010 110 s | 0 | 68 |
| 0000 0000 0010 101 s | 0 | 70 |
| 0000 0000 0010 100 s | 0 | 72 |
| 0000 0000 0010 011 s | 0 | 74 |
| 0000 0000 0010 010 s | 0 | 76 |
| 0000 0000 0010 001 s | 0 | 78 |
| 0000 0000 0010 000 s | 0 | 80 |
| 0000 0000 0011 111 s | 1 | 16 |
| 0000 0000 0011 110 s | 1 | 18 |
| 0000 0000 0011 101 s | 1 | 20 |
| 0000 0000 0011 100 s | 1 | 22 |
| 0000 0000 0011 011 s | 1 | 24 |
| 0000 0000 0011 010 s | 1 | 26 |

TABLE B.15'-continued

APPENDIX C

| Variable length code (Note 1) | Run | Level |
|---|---|---|
| 0000 0000 0011 001 s | 1 | 28 |
| 0000 0000 0001 0011 s | 1 | 30 |
| 0000 0000 0001 0010 s | 1 | 32 |
| 0000 0000 0001 0001 s | 1 | 34 |
| 0000 0000 0001 0000 s | 1 | 36 |
| 0000 0000 0001 0100 s | 6 | 6 |
| 0000 0000 0001 0011 s | 11 | 4 |
| 0000 0000 0001 1001 s | 12 | 4 |
| 0000 0000 0001 1000 s | 13 | 4 |
| 0000 0000 0001 0111 s | 14 | 4 |
| 0000 0000 0001 0110 s | 15 | 4 |
| 0000 0000 0001 0101 s | 16 | 4 |
| 0000 0000 0001 1111 s | 27 | 2 |
| 0000 0000 0001 1110 s | 28 | 2 |
| 0000 0000 0001 1101 s | 29 | 2 |
| 0000 0000 0001 1100 s | 30 | 2 |
| 0000 0000 0001 1011 s | 31 | 2 |

NOTES
1 The last bit 's' denotes the sign of the level: '0' for positive, '1' for negative.
2 "End of Block" shall not be the only code of the block.

What is claimed is:

1. A decoder apparatus for decoding compressed, encoded digital video signals, comprising in operative combination:
   a) a decoder circuit for decoding compressed, encoded digital video signals, said decoder circuit further comprising
      at least one decoding table, said decoding table permitting decoding an encoded, compressed digital signal video input word into a predefined decoded compressed digital signal video output value, said at least one decoding table including a plurality of pre-calculated level values to predefine said compressed digital signal video output value, said predefined compressed digital signal video output value eliminates at least one multiplication and one addition calculation otherwise required in a subsequent inverse quantisation step; and
   b) an inverse quantiser circuit to decompress said predefined decoded, compressed digital video output signal value in accordance with an inverse quantization code segment stored in a program memory.

2. A decoder apparatus as in claim 1 wherein said data memory comprises digital data signals corresponding to a first variable length code decoding table comprising level values equal to two times the level value provided in table B.14 of Annex B of the ISO/IEC 31818-2 standard, a second variable length code decoding table comprising level values equal to two times the level value plus one as compared to the level values provided in table B.14 of Annex B of the ISO/IEC 31818-2 standard, and a third variable length code decoding table comprising level values equal to two times the level value provided in table B.15 of Annex B of the ISO/IEC 31818-2 standard.

3. A decoder apparatus as in claim 2 wherein said program memory is a microprocessor useable medium having a microprocessor readable program code embodied therein for calculating the inverse quantised value of said decoded, compressed digital video output signal, said microprocessor readable program code in said inverse quantiser circuit comprising:
   a) a microprocessor readable program code segment for receiving said decoded, compressed digital video output signal from a said decoder circuit; and b) a microprocessor readable program code segment for causing a microprocessor to calculate an inverse-quantised digital video output signal according to the calculation $$IQC = QF' \times W \times quantizer\_scale/32,$$

where
- IQC is the inverse quantised digital video signal level value,
- QF' is said decoded, compressed digital video signal as provided by said first, second, and third tables embodied in said data memory,
- W is a weighting value, and
- quantizer_scale is a quantiser scale factor value.

4. A decoder device for decoding variable length coded, compressed digital data signals, the decoder device including at least a general purpose computer, and at least one memory, the memory having computer readable code means embodied therein for causing the general purpose computer to decode the variable length coded, compressed digital data signal, the computer readable program code means in said decoder device further comprising:

a) a computer readable code program means for receiving a variable length coded, compressed digital data signal word and retrieving a run/level pair value corresponding to the variable length coded, compressed digital data signal word from one of at least one variable length coding tables, said run/level pair value being pre-calculated to eliminate at least one multiplication and one addition step otherwise required in a subsequent decompression operation;

b) a computer readable program code means for converting said run/level pair values into an array of a plurality of level values; and c) a computer readable program code means for inverse quantising each one of said plurality of level values to provide an array of decoded, inverse-quantised level values.

5. A decoder as in claim 4 wherein said variable length coded, compressed digital data signal is an MPEG compressed video signal.

6. A decoder device as in claim 5 wherein said variable length code decoding tables comprise at least one of a first variable length code decoding table comprising level values equal to two times the level value provided in table B.14 of Annex B of the ISO/IEC 31818-2 standard, a second variable length code decoding table comprising level values two times the level value plus one as compared to the level values provided in table B.14 of Annex B of the ISO/IEC 31818-2 standard, and a third variable length code decoding table comprising level values equal to two times the level value provided in table B.15 of Annex B of the ISO/IEC 31818-2 standard.

7. A decoder device as in claim 6 wherein the computer readable program code means for inverse quantising each one of said plurality of level values included the following calculation:

$$IQC[v][u] = QF'[v][u] \times W \times quantizer\_scale/32$$

where
- IQC[v][u] is the inverse-quantised level value at position (v, u) in said array;
- QF'[v][u] is the decoded, quantised level value at position [v][u] in said array;
- W is a weighting value; and
- quantizer_scale is a quantiser scale factor value having a predetermined value provided in the digital data signal.

8. A program storage device readable by a machine, tangibly embodying a program of instructions executable by the machine to perform method steps for decoding and inverse quantising a variable length coded, quantised digital data video signal, said video signal encoded and quantised according to the ISO/IEC 31818-2 Standard, said method comprising:

decoding the variable length coded, quantised digital data video signal using a decoding table selected from one of a first variable length code decoding table comprising level values equal to two times the level value provided in table B.14 of Annex B of the ISO/IEC 31818-2 standard, a second variable length code decoding table comprising level values two times the level value plus one as compared to the level values provided in table B.14 of Annex B of the ISO/IEC 31818-2 standard, and a third variable length code decoding table comprising level values equal to two times the level value provide in table B.15 of Annex B of the ISO/IEC 31818-2 standard.

9. The method of claim 8 further comprising:

inverse quantising the decoded, quantised digital video signal by causing a microprocessor to calculate an inverse-quantised digital video signal according to the calculation $$IQC = QF' \times W \times quantizer\_scale/32$$

where
- IQC is the inverse quantised digital video signal value,
- QF' is the decoded, quantised digital video signal provided by said decoder circuit,
- W is a weighting value, and
- quantizer_scale is a predetermined quantiser scale factor value provided in the video signal.

10. A method for decoding a variable length coded, quantised data signal, comprising:

a) providing a machine readable data storage means having tangibly embodied therein at least one variable length code (VLC) decoding table, the VLC table comprising a plurality of pre-calculated level values, the VLC decoding table eliminating at least one multiplication and one addition calculation otherwise required in an inverse quantisation calculation;

b) decoding the data signal using the VLC decoding table to provide a decoded, quantised data signal value; and c) inverse quantising said decoded, quantised data signal value with a computer readable program code means embodying an inverse quantisation calculation that is reduced in complexity as a result of including the effect of at least a portion of otherwise required calculational steps in said decoded, quantised data signal value.

11. The method of claim 10 wherein:

a) the data signal is an MPEG encoded video signal; and said providing step included providing a machine readable memory means having tangibly embodied therein digital data, said digital data corresponding to at least one of a first variable length code decoding table comprising level values equal to two times the level value provided in table B.14 of Annex B of the ISO/IEC 31818-2 standard, a second variable length code decoding table comprising level values equal to two times the level value plus one as compared to the level values provided in table B.14 of Annex B of the ISO/IEC 31818-2 standard, and a third variable length code decoding table comprising level values equal to two times the level value provide in table B.15 of Annex B of the ISO/IEC 31818-2 standard.

12. The method of claim 11 wherein said inverse quantising step is executed according to the following equation:

$$IQC = QF' \times W \times quantizer\_scale/32$$

where
- IQC is the inverse quantised digital video signal value,
- QF' is the decoded, quantised digital video signal,
- W is a weighting value, and
- quantizer_scale is a predetermined quantiser scale factor value provided in the MPEG encoded video signal.

13. A memory for storing data for access by an application program being executed on a data processing system, comprising:
- a first data structure stored in said memory, said first data structure including information resident in a database used by said application program and comprising,
  - a plurality of first level values used for decoding compressed, encoded digital video signals, wherein each first level value comprises
    - a first level value equal to two times the level value provided in table B.14 of Annex B of the ISO/IEC 31818-2 standard;
- a second data structure stored in said memory, said second data structure including information resident in a database used by said application program and comprising,
  - a plurality of second level values used for decoding compressed, encoded digital video signals, wherein each second level value comprises
    - a second level value equal to two times the level value plus one as compared to the level values provided in table B.14 of Annex B of the ISO/IEC 31818-2 standard; and
- a third data structure stored in said memory, said third data structure including information resident in a database used by said application program and comprising,
  - a plurality of third level values used for decoding compressed, encoded digital video signals, wherein each third level value comprises
    - a third level value equal to two times the level value provided in table B.15 of Annex B of the ISO/IEC 31818-2 standard.

\* \* \* \* \*